United States Patent
Yan et al.

(10) Patent No.: US 11,115,194 B2
(45) Date of Patent: Sep. 7, 2021

(54) GRAY IMAGE VISUAL ENCRYPTION METHOD

(71) Applicant: SHANDONG UNIVERSITY OF SCIENCE AND TECHNOLOGY, Qingdao (CN)

(72) Inventors: Bin Yan, Qingdao (CN); Hongmei Yang, Qingdao (CN); Zhengxiang Pan, Qingdao (CN); Na Chen, Qingdao (CN); Jianjun Hao, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 143 days.

(21) Appl. No.: 16/475,545

(22) PCT Filed: Aug. 24, 2018

(86) PCT No.: PCT/CN2018/102211
§ 371 (c)(1),
(2) Date: Jul. 2, 2019

(87) PCT Pub. No.: WO2020/029334
PCT Pub. Date: Feb. 13, 2020

(65) Prior Publication Data
US 2021/0044431 A1    Feb. 11, 2021

(30) Foreign Application Priority Data
Aug. 8, 2018 (CN) .......................... 201810894261.0

(51) Int. Cl.
*H04L 9/08* (2006.01)
*G06T 7/11* (2017.01)
(Continued)

(52) U.S. Cl.
CPC .......... *H04L 9/0838* (2013.01); *G06T 1/0028* (2013.01); *G06T 7/11* (2017.01); *H04L 9/06* (2013.01)

(58) Field of Classification Search
CPC ......... H04L 9/0838; H04L 9/06; H04L 9/085; G06T 7/11; G06T 1/0028; G09C 5/00
See application file for complete search history.

(56) References Cited

U.S. PATENT DOCUMENTS

| 5,715,316 A * | 2/1998 | Steenblik ................. G09C 5/00 273/157 A |
| 2002/0083324 A1* | 6/2002 | Hirai .................... H04N 7/1675 713/176 |

(Continued)

FOREIGN PATENT DOCUMENTS

WO    2020029334 A1    12/2020

OTHER PUBLICATIONS

International Search Report issued in corresponding International Application No. PCT/CN2018/102211, dated May 5, 2019; State Intellectual Property Office of the P.R. China, Beijing, China, 7 pgs.

(Continued)

*Primary Examiner* — Aravind K Moorthy
(74) *Attorney, Agent, or Firm* — Hauptman Ham, LLP

(57) ABSTRACT

Disclosed is a gray image visual encryption method. According to the method, two processes of generating a shared image in visual cryptography and performing superimposition decoding are placed within one error diffusion feedback loop. That is, at an encoder end, each pixel or image block is sequentially processed in a particular scanning order, a superimposition decoding effect of each pixel or image block on the generated shared image is immediately checked, a difference between a reconstructed target image obtained by superposition and an original secret image is obtained by comparison, and the difference of (Continued)

comparison is fed back and diffused onto a surrounding unquantized pixel or image block, so as to achieve a purpose of improving quality of a secret image reconstructed by decoding; an analysis process corresponds to the process of generating the shared image from the secret image, and a synthesis process corresponds to the process of obtaining the target image from the shared image; according to the method, the synthesis is placed in the analysis, that is, the analysis is based on the synthesis.

6 Claims, 3 Drawing Sheets

(51) Int. Cl.
*G06T 1/00* (2006.01)
*H04L 9/06* (2006.01)

(56) References Cited

U.S. PATENT DOCUMENTS

| | | | | |
|---|---|---|---|---|
| 2004/0075817 A1* | 4/2004 | Agostinelli | ........... | H04N 9/3132 353/34 |
| 2006/0115082 A1* | 6/2006 | Kevenaar | ............. | G07D 7/0047 380/216 |
| 2006/0177060 A1* | 8/2006 | Johnson | ................... | H04N 1/44 380/255 |
| 2006/0227969 A1* | 10/2006 | Johnson | ................... | G09G 5/12 380/210 |
| 2007/0046690 A1* | 3/2007 | Madden | ............... | H04N 9/3132 345/590 |
| 2007/0057886 A1* | 3/2007 | Johnson | ................... | G09C 5/00 345/90 |
| 2008/0120674 A1* | 5/2008 | Suzuki | ................ | G06T 1/0028 725/118 |
| 2009/0245512 A1* | 10/2009 | Masui | ..................... | G09C 5/00 380/54 |
| 2009/0285478 A1* | 11/2009 | Thiebaud | ............. | H04N 1/6058 382/166 |
| 2010/0008505 A1* | 1/2010 | Bai | ........................ | H04L 9/085 380/255 |
| 2010/0284180 A1* | 11/2010 | Popovich | ............. | H04N 9/3164 362/231 |
| 2011/0075842 A1* | 3/2011 | Le Barz | ................ | H04N 19/503 380/212 |
| 2011/0194688 A1* | 8/2011 | Le Barz | ................. | H04N 19/61 380/217 |
| 2012/0328095 A1* | 12/2012 | Takahashi | ............ | H04N 1/4486 380/28 |
| 2013/0103943 A1* | 4/2013 | Hirsch | ..................... | G09G 3/20 713/168 |
| 2013/0135588 A1* | 5/2013 | Popovich | ........... | G03B 21/2073 353/8 |
| 2015/0070402 A1* | 3/2015 | Shah | ........................ | G09G 3/20 345/690 |
| 2015/0106950 A1* | 4/2015 | Holman | .............. | G06F 21/6245 726/26 |
| 2016/0224528 A1* | 8/2016 | Trevarthen | .......... | G06F 3/04883 |
| 2016/0373440 A1* | 12/2016 | Mather | ............... | H04L 63/0861 |
| 2017/0061851 A1* | 3/2017 | Morovic | ............. | G09G 3/3413 |
| 2018/0174528 A1* | 6/2018 | Botzas | .................... | G09G 5/10 |
| 2018/0268743 A1* | 9/2018 | Matsusaka | ......... | H04N 1/00411 |
| 2021/0044431 A1* | 2/2021 | Yan | .......................... | G09C 5/00 |

OTHER PUBLICATIONS

Written Opinion issued in corresponding International Application No. No. PCT/CN2018/102211; dated May 5, 2019; State Intellectual Property Office of the P.R. China, Beijing, China, 6 pgs.
Search Report issued in corresponding Chinese Application No. 201810894261.0; dated Mar. 25, 2019; 3 pgs.
Office Action issued in corresponding Chinese Application No. 201810894261.0; dated Apr. 3, 2019; 8 pgs.
Notice to Grant issued in corresponding Chinese Application No. 201810894261.0; dated Apr. 24, 2019; 3 pgs.

* cited by examiner

GRAY IMAGE VISUAL ENCRYPTION METHOD

RELATED APPLICATIONS

The present application is a National Phase of International Application Number PCT/CN2018/102211, filed Aug. 24, 2018, which claims priority to Chinese Patent Application No. 201810894261.0, filed Aug. 8, 2018.

TECHNICAL FIELD

The present disclosure relates to the field of multimedia communication security, and in particular to a gray image visual encryption method.

BACKGROUND

Visual encryption is a secret sharing method that is efficient in decoding process and does not require any calculation. One type of (n, k) threshold visual cryptography may divide one secret image into n parts for transmission, and contents of the secret image can only be recovered by obtaining and superimposing at least k parts of the n parts. In recent years, the research of the visual cryptography focuses on two key points: one point is to reduce a size of a shared image, and the other is to improve a visual quality of a reconstructed image. The size of the shared image may be generally extended relative to the size of the secret image, and the visual cryptography with a small extension coefficient or even a non-extended size has advantages of a low processing complexity, occupation of a small storage space and occupation of a low transmission bandwidth, and the like. For a binary secret image, typical size-invariant visual cryptography algorithms may include three methods, i.e., a random grid method, a probability algorithm and a block segmentation encoding method. However, the quality of the reconstructed image is substantially lowered while the size of the shared image is reduced. Especially, the quality of the reconstructed image of a gray secret image is far from quality requirements.

Unlike ordinary binary image visual cryptography, the secret images of gray and colour image visual cryptography are gray and colour images, and reconstructed images are images presenting similar halftone. For the gray image visual cryptography, the current research of Size-Invariant Visual Cryptography may be roughly divided into two categories. One category is a scheme of separating halftoning from visual cryptography encryption, and the other is a scheme of performing direct block segmentation quantization and mapping.

The first scheme of separating halftoning from visual cryptography includes the following process.

Firstly, a gray image is converted into a binary image, for example, by use of halftoning or a simple fixed threshold binary quantization technology, and then, visual cryptography encoding is performed for the binary image. A halftoning process is separated from a visual encryption process in the scheme. The subsequent visual cryptography encryption is not considered in the halftoning process; but it is not considered whether a processed image is a halftoned image or a binary image similar to a company logo during visual encryption. At present, such algorithm is a mainstream algorithm of the gray image visual cryptography.

The second scheme of performing direct blocked quantization and mapping includes the following process.

Firstly, block segmentation is performed for the gray image, and then, an average grayscale of each block is quantized into a different quantization levels. These quantization levels correspond to different binary patterns on the reconstructed image, and each binary pattern has a different block average grayscale, so that the reconstructed image may approximately express local brightness and colour of a secret image in different binary patterns.

Two major problems exist in the existing framework.
1. A brightness loss on a reconstructed image is not compensated; 2. the quality of the reconstructed image is not directly optimized.

Firstly, lossy mapping from a secret pixel/image block to a reconstructed image/image block is not compensated by other surrounding pixels and image blocks. Due to the limitation of a security condition of visual cryptography, a capability of expressing a secret binary image on the reconstructed image is limited. For example, if a 2-by-2 image block is adopted, there are five types of image blocks of the secret image according to the number of black pixels within the blocks. However, only three types of possible image blocks are allowed to exist on the reconstructed image, where the number of black pixels is 2, 3 and 4 respectively. In this case, many-to-one lossy mapping may exist from the secret image block to the reconstructed image block. Current existing algorithms cannot compensate such brightness loss.

Next, the existing algorithm does not directly optimize perceptual quality of the reconstructed image. Further, although the reconstructed image is a halftone type image, a measure of the image quality used in the existing algorithm does not reflect how a human visual system perceives the halftone image. Specifically, a spectrum characteristic of the reconstructed image is not reflected in the existing quality measure.

The quality measures commonly used in existing literatures are intra-block variance and global contrast. The intra-block measure measures uniformity of the reconstructed image relative to the secret binary image, but does not measure the perceptual quality of the halftone reconstructed image. The global contrast measure measures a brightness difference of image blocks for expressing black secret pixels and white secret pixels on the reconstructed image, and also this measure is designed for the secret binary image. Recently, X. T. Wu et al propose visual cryptography generating a shared image with a blue noise. However, after two blue-noise shared images are superimposed, the reconstructed image will no longer have the blue noise characteristic. Therefore, such algorithm is only applicable to performing encryption after simple binarization of the gray secret image, thereby having a very low detail resolving capability.

SUMMARY

The object of the present disclosure is to provide a gray image visual encryption method to improve visual quality of a reconstructed target image.

To achieve the above object, the following technical solution is adopted in the present disclosure.

A gray image visual encryption method includes the following steps.

Step s11: colour gamut mapping

An input secret image is a gray image J[n], where $n=[n_x, n_y]$, $n_x$ refers to a horizontal position of a pixel, $n_y$ refers to a vertical position of the pixel, and a size of an image block is determined as B×B; and a colour gamut of the gray image J[n] is mapped into a colour gamut of a reconstructed image (i.e., a target image) superimposed with visual cryptography.

Step s12: block segmentation

Block segmentation is performed for the image subjected to the colour gamut mapping to obtain a plurality of mutually non-overlapped image blocks with the size being B×B; and each image block is sequentially accessed in a grating scanning order, and one image block is processed each time.

Step s13: vector quantization

Each image block is quantized into a binary image block by using a vector quantizer, that is, a value of each pixel after quantization is 0 or 1.

Step 14: vector visual encryption k shared image blocks $s_1[n], \ldots, s_k[n]$ are obtained by performing vector visual cryptography encoding for the quantized binary image block.

Step s15: simulation of superimposition decoding the k shared image blocks $s_1[n], \ldots, s_k[n]$ are superimposed, that is, a target image block $\hat{y}[n]$ is obtained by multiplying pixel values corresponding to different shared image blocks for visual cryptography decoding.

Step s16: error calculation

An error between an input image block $\hat{x}[n]$ of the vector quantizer and the target image block $\hat{y}[n]$ is calculated as $e[n]$: $e[n]=\hat{x}[n]-\hat{y}[n]$.

Step s17: vector error diffusion

The error $e[n]$ is diffused into four image blocks around the current image block by using a vector error diffusion filter $H[n]$; and the error after diffusion is $\hat{e}[n]$, a modified image block $\hat{x}[n]=x[n]+\hat{e}[n]$ is obtained by modifying input pixel values of the above four image blocks with the error $\hat{e}[n]$, and the modified image block $\hat{x}[n]$ is used as an input of the vector quantizer at step s13.

Step s18: each image block is processed through the above steps s13-s17, and an output result of the visual encryption method is obtained by using the k shared images $s_1[n], \ldots, s_k[n]$ as outputs after the processing of all image blocks is completed.

Preferably, the step s11 specifically includes:

step s111: calculating the number of pixels $m=B^2$ within an image block;

step s112: calculating the maximum brightness $\hat{y}_{max}$ representable by the target image block; and step s113: determining colour gamut mapping as $$G_A : x[n] = \frac{\hat{y}_{max}}{m} J[n],$$

where x[n] refers to an image subjected to colour gamut mapping.

Preferably, the step s13 specifically includes:

step s131: sequentially processing each pixel in each image block $\hat{x}[n]$ input into the vector quantizer in a grating scanning order;

step s132: quantizing each pixel by using a binary scalar quantizer, setting a quantization threshold to ½, and setting output reconstruction points to 0 and 1;

step s133: diffusing input and output errors of the binary scalar quantizer onto other unquantized pixels in the image block by using an error diffusion filter; and step s134: outputting the quantized image block as an output of the vector quantizer after all pixels are processed.

Preferably, the step s14 specifically includes:

step s141: constructing a basic matrix $C_j$ by using basic matrixes $A_0$ and $A_1$ of any type of (k,k) threshold visual cryptography, where $$C_j = \left[ \underbrace{A_0 \ldots A_0}_{|D|-j} \underbrace{A_1 \ldots A_1}_{j} \right]; j = 0, \ldots, |D|-1;$$

D refers to a set of numbers of all possible white pixels in the target image block, and |D| refers to the number of elements in the set D; and step s142: selecting the matrix $C_j$ according to the number of white pixels in the image blocks of the input secret image;

obtaining k shared image blocks $s_1[n], \ldots, s_k[n]$ by disorganizing columns of the matrix $C_j$, rearranging each row of the matrix into a B×B image block, and distributing the image block to one shared image as the corresponding image block of the shared image.

Preferably, a method of selecting the matrix $C_j$ at step s142 includes that:

for the image block of one secret image, when the number of pixels within the image block is m, the set of the numbers of all possible white pixels is $M=\{0,1,\ldots,m\}$; a set of the basic matrixes obtained at step s141 is $\Gamma=\{C_j: j=0,1,\ldots,|D-1|\}$.

based on this, one mapping $\Phi: M \to \Gamma$ from M to $\Gamma$ is designed only by satisfying as follows:

for two optional $m_1, m_2 \in M$ and $C_{j_1}, C_{j_2} \in \Gamma$, it is required that $j_1 \le j_2$ when $m_1 < m_2$; and one matrix $C_j$ is selected by giving the number of white pixels within the secret image block according to this mapping.

Preferably, the step s17 specifically includes:

step s171: neighbourhood selection selecting four image blocks located at the right side, the left lower side, the lower side, and the right lower side of the current image block as neighbours of the current image block, where these neighbours are destinations to which the error of the current image block is diffused; and step s172: diffusing the error $e[n]$ into the image blocks in the neighbourhood by using the vector error diffusion filter $H[n]$ as follows:

sequentially accessing each pixel in the current image block, calculating the error between the pixel of the reconstructed image and the input pixel of the vector quantizer, and diffusing the error onto a pixel around the current image block by using an ordinary scalar error diffusion filter; and if the error is diffused onto one quantized pixel, not changing the pixel value and allowing, by the pixel, the diffused error to be unchanged, and transmitting the diffused error to its surrounding pixel with a same scalar error diffusion filter.

Preferably, the method is applicable to any of the following three types of visual cryptography designed for a binary image, that is, probability visual cryptography, random grid visual cryptography and vector visual cryptography.

The present disclosure has the following advantages.

(1) The visual cryptography of the gray image may be constructed conveniently by combining the method of present disclosure with any one of existing probability visual cryptography, random grid visual cryptography and vector visual cryptography for the binary image, and the visual quality of the reconstructed target image may be significantly improved. (2) The method of the present disclosure satisfies contrast and security conditions of the gray visual cryptography; and the gray image visual cryptography obtained by the method is perfect and secure as long as the basic binary visual cryptography is perfect and secure.

DETAILED DESCRIPTION OF THE EMBODIMENTS

A basic idea of the present disclosure is described below.

Figure 1:
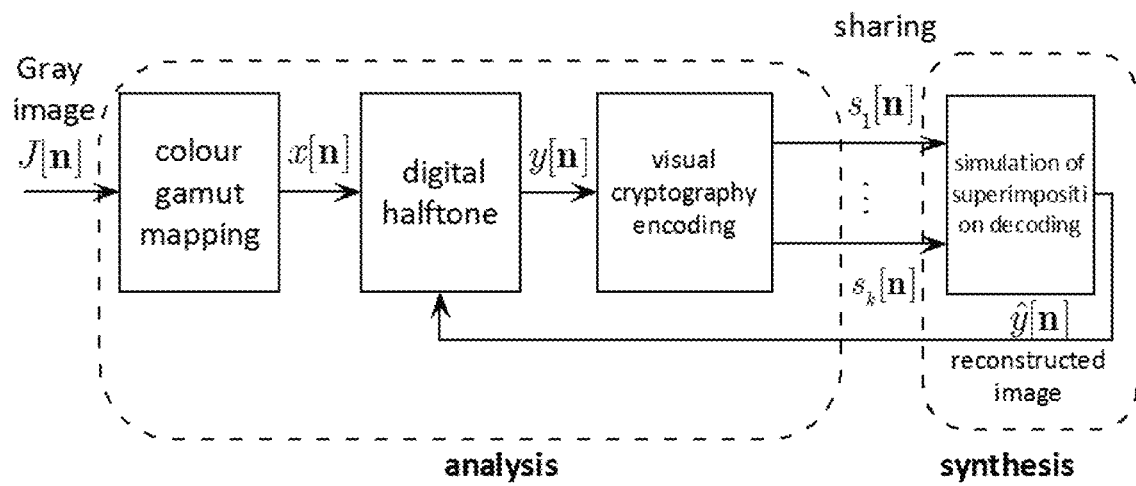
FIG. 1 is a block diagram illustrating a principle of a gray image visual encryption method according to an example of the present disclosure.

As shown in FIG. 1, there is provided an encrypter having a Analysis-by-Synthesis (AbS) framework with closed-loop feedback, and visual cryptography is designed from a perspective of Analysis-by-Synthesis (AbS), that is, a process of segmenting a secret image into shared images is an analysis portion of the present disclosure, and a process of generating a reconstructed image by superimposing the shared images in the encrypter is a synthesis portion of the present disclosure.

The AbS has a basic meaning that the shared images obtained through encryption are decoded in the encrypter (rather than a decoder), and a decoding result is used as a basis for optimizing visual quality. Specifically, in the AbS framework, a difference between a current reconstructed pixel (or image block) and a secret pixel (or image block) is obtained by feeding back the reconstructed image synthesized by the encrypter to the analysis portion. In this case, the above difference may be compensated by carefully adjusting a proportion of black and white pixels in a generated binary image in a halftoning process. Structurally, the visual encryption and decoding are moved into a feedback loop of an error diffusion halftone algorithm.

The AbS framework provided by the present disclosure has high flexibility, and may be combined with three types of existing size-invariant visual cryptography, that is, the AbS framework is combined with any of the probability visual cryptography, the random grid visual cryptography and the vector visual cryptography so that AbS-based probability visual cryptography, AbS-based random grid visual cryptography and AbS-based vector visual cryptography may be obtained respectively. An obtained encryption system has perfect secrecy defined by Shannon.

The present disclosure will be further described below in detail in combination with accompanying drawings and specific examples.

Figure 3:
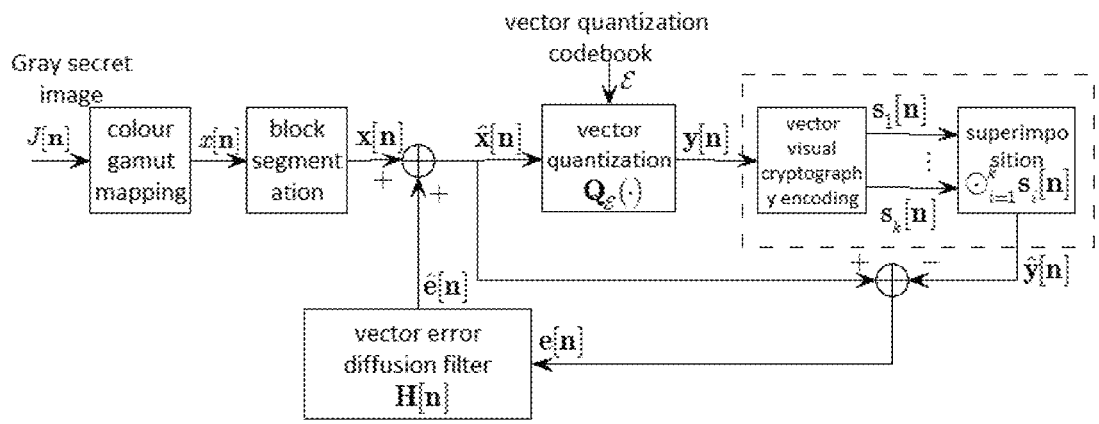
FIG. 3 is a flowchart illustrating a gray image visual encryption method according to another example of the present disclosure.

As shown in FIG. 3, a gray image visual encryption flow will be described below with a combination of a method of the present disclosure and vector visual cryptography as an example.

A gray image visual encryption method includes the following steps.

Step s11: colour gamut mapping

An input secret image is a gray image $J[n]$ where $n=[n_x, n_y]$, $n_x$ refers to a horizontal position of a pixel, $n_y$ refers to a vertical position of the pixel, and a size of an image block is determined as $B \times B$; and a colour gamut of the gray image $J[n]$ is mapped into a colour gamut of a reconstructed image (i.e., a target image) superimposed with visual cryptography.

The step s11 specifically includes the following steps.

The step s111, the number of pixels $m=B^2$ within an image block is calculated.

At step s112, the maximum brightness $\hat{y}_{max}$ representable by a target image block is calculated.

A method of calculating the maximum brightness $\hat{y}_{max}$ is as follows: exhausting all possible target image blocks, calculating the number of white pixels for each image block as brightness of the image block, and calculating a maximum value of all brightness as $\hat{y}_{max}$.

At step s113, colour gamut mapping is determined as $$G_A : x[n] = \frac{\hat{y}_{max}}{m} J[n],$$

where $x[n]$ refers to an image subjected to the colour gamut mapping.

The stability of the entire error diffusion feedback loop can be ensured by using the colour gamut mapping at the above step.

If necessary (for example, when the input secret image is very low in contrast), histogram equalization may be firstly performed for the input image, and then, the above colour gamut mapping is used for the input image.

Step s12: block segmentation

Block segmentation is performed for the image subjected to the colour gamut mapping to obtain a plurality of mutually non-overlapped image blocks with the size being $B \times B$.

Each image block is sequentially accessed in a grating scanning order, and one image block is processed each time.

Step s13: vector quantization

Each image block is quantized into a binary image block by using a vector quantizer, that is, a value of each pixel after quantization is 0 or 1.

The step s13 specifically includes the following steps.

At step s131, each pixel of each image block $\hat{x}[n]$ input into the vector quantizer is sequentially processed in a grating scanning order.

At step s132, each pixel is quantized by using a binary scalar quantizer, a quantization threshold is set to ½, and output reconstruction points are set to 0 and 1.

At step s133, input and output errors of the binary scalar quantizer are diffused onto other unquantized pixels in the image block by using an error diffusion filter.

At step s134, the quantized image block is output as an output of the vector quantizer after the processing of all pixels is completed. Vector quantization can be realized by a vector quantizer with less complex scalar quantization and error diffusion.

Step s14: vector visual encryption $k$ shared image blocks $s_1[n], \ldots, s_k[n]$ are obtained by performing vector visual cryptography encoding for the quantized binary image block.

The step s14 specifically includes the following steps.

At step s141, a basic matrix $C_j$ is constructed by using basic matrixes $A_0$ and $A_1$ of any type of $(k,k)$ threshold visual cryptography, where $$C_j = \left[ \underbrace{A_0 \ldots A_0}_{|D|-j} \underbrace{A_1 \ldots A_1}_{j} \right]; j = 0, \ldots, |D|-1.$$

D refers to a set of numbers of all possible white pixels in the target image block, and |D| refers to the number of elements in the set D.

At step s142, the matrix $C_j$ is selected according to the number of white pixels in the image block of the input secret image.

A method of selecting the matrix $C_j$ includes that:

for the image block of one secret image, when the number of pixels within the image block is m, the set of the numbers of all possible white pixels is M={0,1, . . . , m}; a set of the basic matrixes obtained at step s141 is $\Gamma$={$C_j$: j=0,1, . . . , |D−1|}.

Based on this, one mapping $\Phi$: M→$\Gamma$ from M to $\Gamma$ is designed only by satisfying as follows:

for two optional $m_1$, $m_2 \in$M and $C_{j_1}$, $C_{j_2} \in \Gamma$, it is required that $j_1 \leq j_2$ when $m_1 < m_2$.

One matrix $C_j$ is selected by giving the number of white pixels within the secret image block according to this mapping.

For example, when M={0,1, . . . , 4} and $\Gamma$={$C_j$: j=0,1,2}, the mapping of Table 1 may be used, that is, the above condition is satisfied.

TABLE 1

| m | $\Phi$(m) |
|---|---|
| 0 | 0 |
| 1 | 0 |
| 2 | 1 |
| 3 | 2 |
| 4 | 2 |

By using the above mapping, it can be ensured that the secret image block with more white pixels corresponds to the target image block with more white pixels.

The k shared image blocks $s_1[n]$, . . . , $s_k[n]$ are obtained by disorganizing columns of the matrix $C_j$, rearranging each row of the matrix into a B×B image block, and distributing the image block to one shared image as a corresponding image block of the shared image.

By using the above construction solution, a satisfactory basic matrix can be designed according to the number of white pixels in the target image.

Step s15: simulation of superimposition decoding

The k shared image blocks $s_1[n]$, . . . , $s_k[n]$ are superimposed, that is, a target image block $\hat{y}[n]$ is obtained by multiplying pixel values corresponding to different shared image blocks for visual cryptography decoding.

Step s16: error calculation

An error between the input image block $\hat{x}[n]$ of the vector quantizer and the target image block $\hat{y}[n]$ is calculated as e[n]: e[n]=$\hat{x}[n]$−$\hat{y}[n]$.

Step s17: vector error diffusion

The error e[n] is diffused into four image blocks around the current image block by using a vector error diffusion filter H[n]; and the error after diffusion is ê[n], a modified image block $\tilde{x}[n]$=x[n]+ê[n] is obtained by modifying the above input pixel values of the four image blocks with the error ê[n], and the modified image block $\tilde{x}[n]$ is used as an input of the vector quantizer at step s13.

The step s17 specifically includes the following steps.

Step s171: neighbourhood selection

Four image blocks located at the right side, the left lower side, the lower side and the right lower side of the current image block are selected as neighbours of the current image block, where these neighbours are destinations to which the error of the current image block is diffused.

Step s172: the error e[n] is diffused into an image block in the neighbourhood by using the vector error diffusion filter H[n].

Each pixel in the current image block is sequentially accessed, and the error between the pixel of the reconstructed image and the input pixel of the vector quantizer is calculated and diffused onto a pixel around the current image block by using a common scalar error diffusion filter.

The ordinary scalar error diffusion filter may be, for example, an ordinary Floyd-Steinberg filter.

If the error is diffused onto one quantized pixel, the pixel value remains unchanged, and the pixel allows the diffused error to be unchanged and the error is transferred to a surrounding pixel by using a same scalar error diffusion filter.

On the basis of the above solution, high-dimension vector error diffusion can be realized by using a series of less complex scalar error diffusion.

Step s18: each image block is processed through the above steps s13-s17, and an output result of the visual encryption method is obtained by using the k shared images $s_1[n]$, . . . , $s_k[n]$ as an output after the processing of all image blocks is completed.

On the basis of the above process, the visual cryptography of the gray image may be constructed by organically combining the method of the present disclosure with the vector visual cryptography, and the visual quality of the reconstructed target image may be significantly improved.

Figure 4:
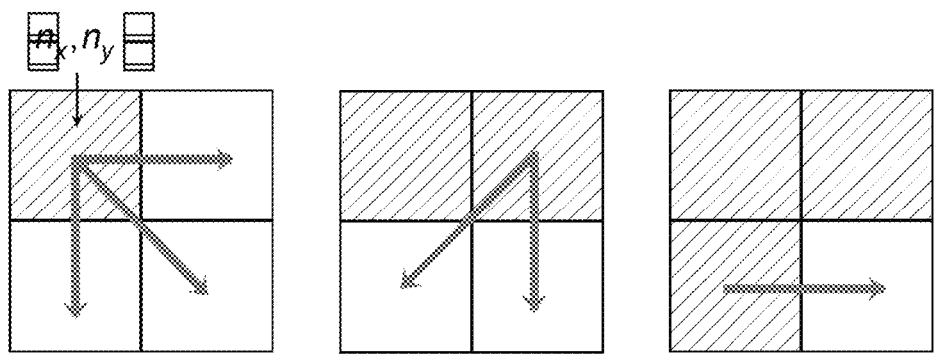
FIG. 4 is a schematic diagram illustrating realizing vector quantization by using scalar quantization and intra-block error diffusion according to an example of the present disclosure.

The vector quantization process may be implemented by combining the intra-block error diffusion with the scalar quantizer. A schematic diagram of the implementation is shown in FIG. 4, where slashed boxes refer to quantized pixels, white boxes refer to unquantized pixels, and the pixels are processed from left to right.

Figure 5:
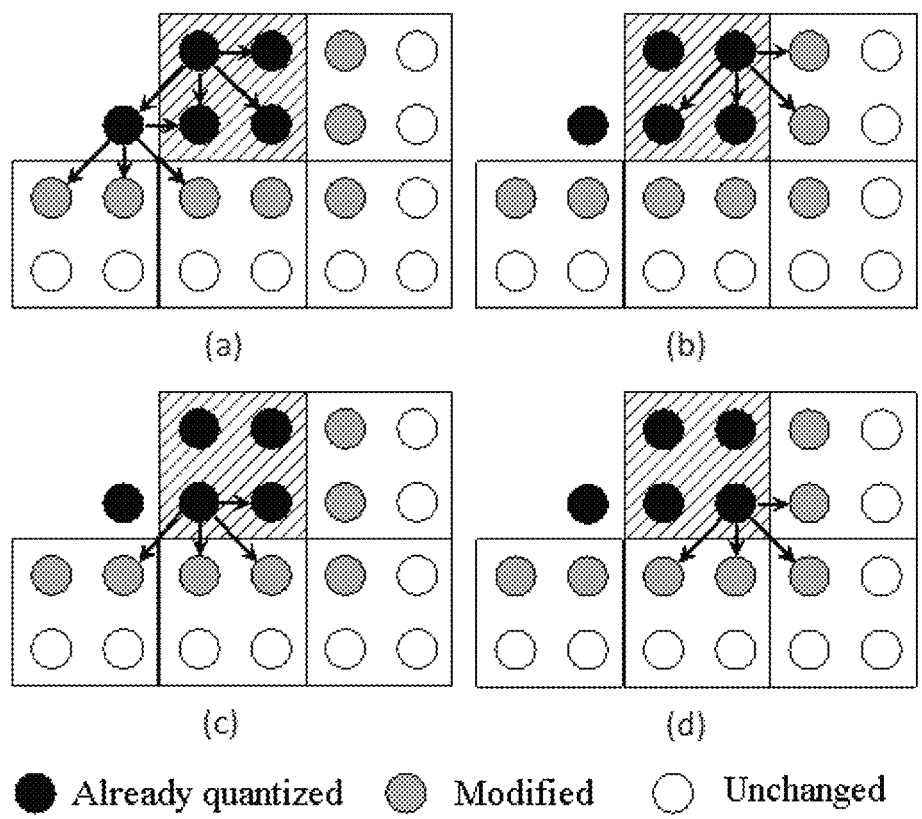
FIG. 5 is a schematic diagram illustrating vector error diffusion according to an example of the present disclosure.

The vector error diffusion may be realized by using sequential scalar quantization and error diffusion, as shown in FIG. 5.

Different pixels in the current image block (slashed box) are sequentially quantized from FIG. 5(a) to FIG. 5(b), and the quantization errors are diffused and transferred onto the unquantized pixels within or outside the current image block.

When k=2,m=4, the following basic matrixes are obtained by using a method of constructing a basic matrix.

$$C_0 = \begin{bmatrix} 1 & 0 & 1 & 0 \\ 0 & 1 & 0 & 1 \end{bmatrix}, C_1 = \begin{bmatrix} 1 & 0 & 1 & 0 \\ 0 & 1 & 1 & 0 \end{bmatrix}, C_2 = \begin{bmatrix} 1 & 0 & 1 & 0 \\ 1 & 0 & 1 & 0 \end{bmatrix}$$

Similarly, when k=3,m=4, the following basic matrixes are obtained.

$$C_0 = \begin{bmatrix} 1 & 1 & 0 & 0 \\ 1 & 0 & 1 & 0 \\ 0 & 1 & 1 & 0 \end{bmatrix}, C_1 = \begin{bmatrix} 1 & 1 & 0 & 0 \\ 1 & 0 & 1 & 0 \\ 1 & 0 & 0 & 1 \end{bmatrix}$$

The inventor compares the quality of the target image of the present disclosure with the quality of target image of two existing algorithms, with a result as follows:

1) D. S. Wang, F. Yi, and X. B. Li, "Probabilistic visual secret sharing schemes for grey-scale images and colour images," Inform. Sci., vol. 181, no. 11, pp. 2189-2208, June 2011.

2) C. N. Yang, "New visual secret sharing schemes using probabilistic method," Pattern Recognition Lett., vol. 25, no. 4, pp. 481-494, March 2004.

Figure 6:
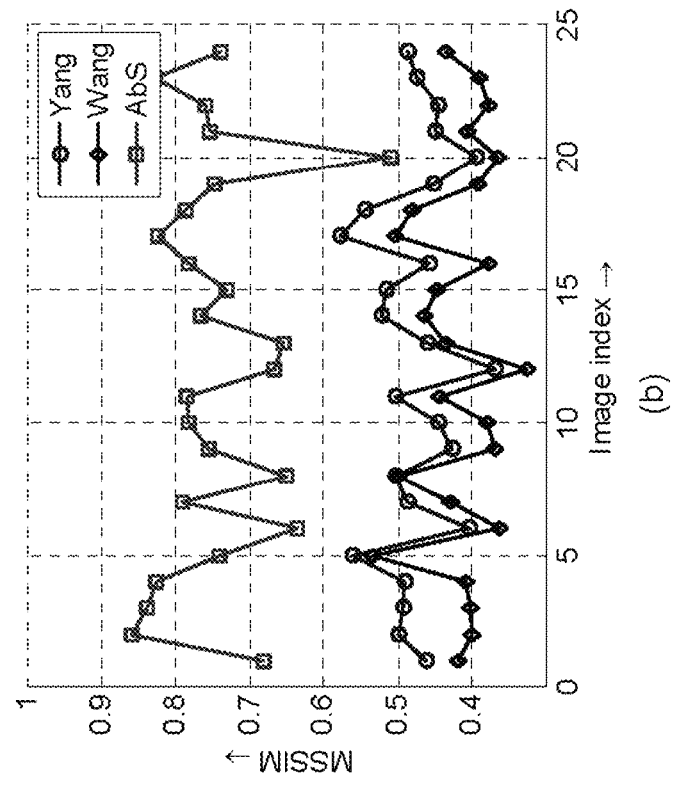
FIG. 6 is a diagram illustrating a result of comparing algorithms of Wang, Yang et al with a method according to an example of the present disclosure.
Figure 6:
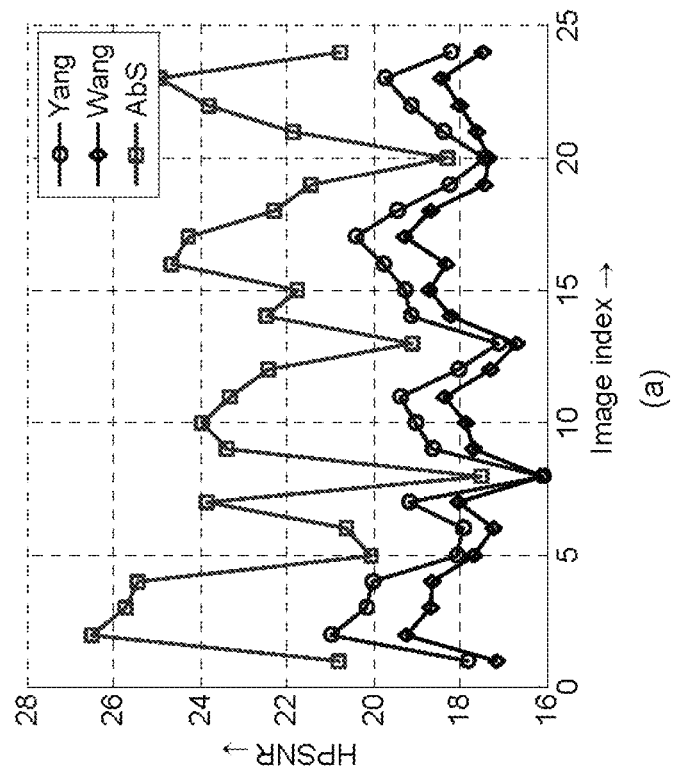

As shown in FIG. 6, the quality of the target image of the present disclosure has a significant performance improvement compared with the algorithms of Wang, Yang, et al. FIG. 6(a) illustrates comparison of PSNR performances of three methods, and FIG. 6(b) illustrates comparison of MSSIM performances of three methods.

During comparisons, 24 natural images in a Kodak database are used, and an abscissa Image index is an index of the 24 images.

It can be seen from FIG. 6 that both Human Peak Signal to Noise Ratio (HPSNR) and Mean Structural Similarity Measure (MSSIM) are significantly improved in the method of the present disclosure.

Figure 2:
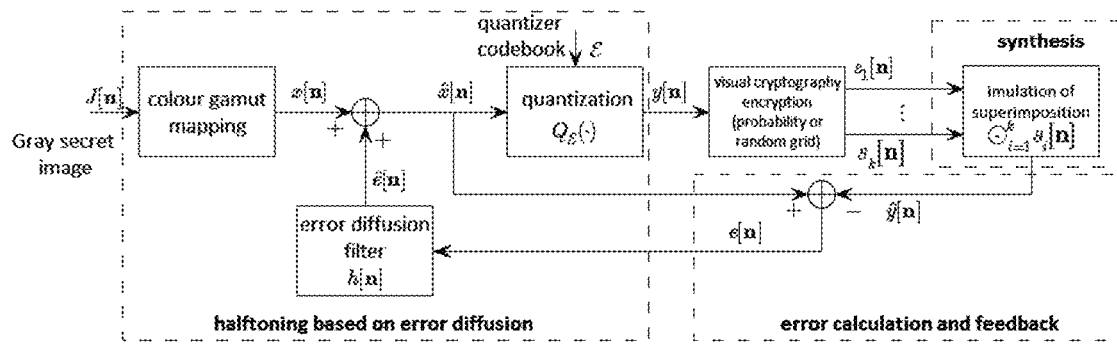
FIG. 2 is a flowchart illustrating a gray image visual encryption method according to an example of the present disclosure.

As shown in FIG. 2, a specific example of the Analysis-by-Synthesis framework is also provided for the probability visual cryptography or the random grid visual cryptography in the present disclosure, where a size of an image block is B=1.

It can be seen from the comparison between FIG. 2 and FIG. 3 that the flow of the gray image visual encryption method for the probability visual cryptography or the random grid visual cryptography is consistent with the flow of the gray image visual encryption method for the vector visual cryptography.

The above flows mainly differ in that the size of the image block of the probability visual cryptography or the random grid visual cryptography is B=1, so that each image block becomes one pixel block. Therefore, visual encryption and decryption portions are both performed for each pixel rather than for one image block as shown in FIG. 3. In addition, the quantization and diffusion are also performed for a pixel in FIG. 2. However, in FIG. 3, the quantization specifically is vector quantization, and the diffusion also is vector diffusion, that is, diffusion into the surrounding image blocks.

Certainly, the foregoing description is merely illustrative of preferred examples of the present disclosure, and the present disclosure is not limited to the examples illustrated above. It is to be noted that all equivalent substitutions and obvious changes that occur to any of those skilled in the art under the teaching of the specification should fall in the substantial scope of the present disclosure and should be protected by the present disclosure.

The invention claimed is:

1. A gray image visual encryption method, comprising the following steps:
    step s11: color gamut mapping
    an input secret image being a gray image J[n], wherein n=[$n_x,n_y$], $n_x$ refers to a horizontal position of a pixel, $n_y$ refers to a vertical position of the pixel, and a size of an image block is determined as B×B; and
    mapping a color gamut of the gray image J[n] into a color gamut of a reconstructed image is, a target imagesuperimposed with visual cryptography;
    step s12: block segmentation
    performing block segmentation for the gray image subjected to the color gamut mapping to obtain a plurality of mutually non-overlapped image blocks with the size being B×B; and
    sequentially accessing each image block in a grating scanning order, and processing one image block each time;
    step s13: vector quantization
    quantizing each image block into a binary image block by using a vector quantizer, that is, a value of each pixel after quantization being 0 or 1;
    step s14: vector visual encryption
    obtaining k shared image blocks $s_1[n], \ldots, s_k[n]$ by performing vector visual cryptography encoding for the quantized binary image block;
    step s15: simulation of superimposition decoding
    superimposing the k shared image blocks $s_1[n], \ldots, s_k[n]$, that is,
    obtaining a target image block ŷ[n] by multiplying pixel values corresponding to different shared image blocks for visual cryptography decoding;
    step s16: error calculation
    calculating an error between an input image block x̂[n] of the vector quantizer and the target image block ŷ[n] as e[n]: e[n]=x̂[n]−ŷ[n];
    step s17: vector error diffusion
    diffusing an error e[n] into four image blocks around a current image block by using a vector error diffusion filter H[n]; and
    the error after diffusion being ê[n], obtaining a modified image block x̂[n]=x[n]+ê[n] by modifying input pixel values of the above four image blocks with the error ê[n], and using the modified image block x̂[n] as an input of the vector quantizer at step s13; and
    the steps s17 specifically comprises:
    step s171: neighborhood selection
    selecting four image blocks located at a right side, a left lower side, a lower side and a right lower side of the current image block as neighbors of the current image block, wherein these neighbors are destinations to which the error of the current image block is diffused; and
    step s172: diffusing the error e[n] into the image blocks in a neighborhood by using the vector error diffusion filter H[n];
    sequentially accessing each pixel in the current image block, calculating the error between the pixel of the reconstructed image and the input pixel of the vector quantizer, and diffusing the error onto a pixel around the current image block by using an ordinary scalar error diffusion filter; and
    when the error is diffused onto one quantized pixel, not changing the pixel value, and allowing, by the pixel, the diffused error to be unchanged, and transferring the error to a plurality of surrounding pixels by a same scalar error diffusion filter;
    step s18: processing each image block through the above steps s13-s17, and obtaining an output result of the visual encryption method by using k shared images $s_1[n], \ldots, s_k[n]$ as an output after the processing of all image blocks is completed.

2. The gray image visual encryption method according to claim 1, wherein,
    the step s11 specifically comprises:
    step s111: calculating the number of pixels m=$B^2$ within an image block;
    step s112: calculating a maximum brightness $ŷ_{max}$ in the target image block; and
    step s113: determining color gamut mapping as $$G_A : x[n] = \frac{ŷ_{max}}{m} J[n],$$

wherein x[n] refers to an image subjected to the color gamut mapping.

3. The gray image visual encryption method according to claim 1, wherein, the step s13 specifically comprises:

step s131: sequentially processing each pixel of each image block $\hat{x}[n]$ input into the vector quantizer in a grating scanning order;

step s132: quantizing each pixel by using a binary scalar quantizer, setting a quantization threshold to ½, and setting output reconstruction points to 0 and 1;

step s133: diffusing input and output errors of the binary scalar quantizer onto other unquantized pixels in the image block by using an error diffusion filter; and step s134: outputting the quantized image block as an output of the vector quantizer after the processing of all pixels is completed.

4. The gray image visual encryption method according to claim 1, wherein the step s14 specifically comprises:

step s141: constructing a basic matrix $C_j$ by using basic matrixes $A_0$ and $A_1$ of any type of (k,k) threshold visual cryptography, wherein $$C_j = \left[ \underbrace{A_0 \ldots A_0}_{|D|-j} \underbrace{A_1 \ldots A_1}_{j} \right]; j = 0, \ldots, |D|-1;$$

D refers to a set of numbers of all possible white pixels in the target image block, and |D| refers to the number of elements in the set D; and step s142: selecting the matrix $C_j$ according to the number of white pixels in the image block of the input secret image; and obtaining k shared image blocks $s_1[n], \ldots, s_k[n]$ by disorganizing columns of the matrix $C_j$, re-arranging each row of the matrix into a B×B image block, and distributing the image block to one shared image as a corresponding image block of the shared image.

5. The gray image visual encryption method according to claim 4, wherein at the step s142, a method of selecting the matrix $C_j$ comprises that:

for the image block of one secret image, when the number of pixels within the image block is m, the set of the numbers of all possible white pixels is M={0,1,...,m}; a set of the basic matrixes obtained at step s141 is $\Gamma = \{C_j: j=0,1,\ldots,|D-1|\}$;

based on this, one mapping $\Phi:M\to\Gamma$ from M to $\Gamma$ is designed only by satisfying as follows:

for two optional $m_1, m_2 \in M$ and $C_{j_1}, C_{j_2} \in \Gamma$, it required that $j_1 \leq j_2$ when $m_1 < m_2$;

one matrix $C_j$ is selected by giving the number of white pixels within the secret image block according to this mapping.

6. The gray image visual encryption method according to claim 1, wherein, the method is applicable to any of the following three types of visual cryptography designed for the binary image, that is, probability visual cryptography, random grid visual cryptography and vector visual cryptography.

* * * * *